(12) United States Patent
Garrett et al.

(10) Patent No.: US 11,567,991 B2
(45) Date of Patent: Jan. 31, 2023

(54) DIGITAL IMAGE CLASSIFICATION AND ANNOTATION

(71) Applicant: Google LLC, Mountain View, CA (US)

(72) Inventors: Maryam Garrett, Cambridge, MA (US); Wan Fen Nicole Quah, Cambridge, MA (US); Gordon Sims, West Newbury, MA (US)

(73) Assignee: GOOGLE LLC, Mountain View, CA (US)

( * ) Notice: Subject to any disclaimer, the term of this patent is extended or adjusted under 35 U.S.C. 154(b) by 167 days.

(21) Appl. No.: 16/619,006

(22) PCT Filed: Apr. 1, 2019

(86) PCT No.: PCT/US2019/025099
§ 371 (c)(1),
(2) Date: Dec. 3, 2019

(87) PCT Pub. No.: WO2020/076362
PCT Pub. Date: Apr. 16, 2020

(65) Prior Publication Data
US 2021/0073272 A1  Mar. 11, 2021

Related U.S. Application Data

(60) Provisional application No. 62/742,866, filed on Oct. 8, 2018.

(51) Int. Cl.
G06F 16/58    (2019.01)
G06F 16/55    (2019.01)
G06N 20/00    (2019.01)
G06F 16/535   (2019.01)
(Continued)

(52) U.S. Cl.
CPC ........ *G06F 16/5866* (2019.01); *G06F 16/535* (2019.01); *G06F 16/55* (2019.01); *G06F 40/169* (2020.01); *G06K 9/6256* (2013.01); *G06N 20/00* (2019.01)

(58) Field of Classification Search
None
See application file for complete search history.

(56) References Cited

U.S. PATENT DOCUMENTS 7,120,586 B2    10/2006 Loui et al.
9,405,774 B2    8/2016  Charania et al.
2009/0232417 A1 9/2009  McMahan
(Continued)

OTHER PUBLICATIONS

European Patent Office; Summons issue in Application No. EP19723234.1; 11 pages; dated Jul. 10, 2020.
(Continued)

*Primary Examiner* — Thu N Nguyen
(74) *Attorney, Agent, or Firm* — Gray Ice Higdon

(57) ABSTRACT

Implementations are described herein for automatically annotating or curating digital images using various signals generated by individual users, in addition to or instead of content of the digital images themselves, thereby to enable the digital images to be retrieved from a searchable database based on their annotations. In particular, techniques are described herein for identifying events associated with a user, e.g., based on natural language input provided by a user, and automatically classifying/annotating images inferred to be related to those events.

19 Claims, 6 Drawing Sheets

(51) Int. Cl.
   *G06F 40/169*   (2020.01)
   *G06K 9/62*     (2022.01)

(56) References Cited

U.S. PATENT DOCUMENTS

| | | | | | |
|---|---|---|---|---|---|
| 2011/0137910 | A1* | 6/2011 | Hibino | ............... | G06F 16/583 |
| | | | | | 707/741 |
| 2013/0346068 | A1* | 12/2013 | Solem | ............... | G10L 15/26 |
| | | | | | 704/9 |
| 2014/0046767 | A1* | 2/2014 | Klanjsek | ............... | G06Q 30/02 |
| | | | | | 705/14.64 |
| 2014/0270407 | A1* | 9/2014 | Balakrishnan | ..... | G06K 9/00677 |
| | | | | | 382/118 |
| 2015/0006545 | A1* | 1/2015 | Das | ............... | G06F 16/435 |
| | | | | | 707/748 |
| 2015/0033150 | A1* | 1/2015 | Lee | ............... | H04N 5/23218 |
| | | | | | 715/753 |

OTHER PUBLICATIONS

European Patent Office; Examination Report issued in Application No. 19723234.1; 8 pages; dated Feb. 6, 2020.

Karpathy, A. "Automated Image Captioning with ConvNets and Recurrent Nets;" available from https://cs.stanford.edu/people/karpathy/sfmltalk.pdf; 105 pages.

Mao, J. "Deep Captioning with Multimodal Recurrent Neural Networks (M-RNN)"; arXiv.org; arXiv:1412:6632v5; 17 pages; Jun. 11, 2015.

Vinyals, O. et al. "Show and Tell: A Neural Image Caption Generator;" 2015 IEEE Conference on Computer Vision and Pattern Recognition (CVPR); 9 pages.

Xu, K. et al. "Show, Attend and Tell: Neural Image Caption Generation with Visual Attention;" 32nd International Conference on Machine Learing, France; 10 pages; Jul. 2015.

Feuz, S. et al., "Automatic Context-Aware Image Captioning;" Technical Disclosure Commons; https://www.tdcommons.org/dpubs_series/532; 6 pages; May 23, 2017 23.

European Patent Office; International Search Report and Written Opinion of Ser. No. PCT/US2019/025099; 15 pages; dated Jul. 17, 2019.

Shaikh, Faizan, "Automatic Image Captioning using Deep Learning (CNN and LSTM) in PyTorch;" Analytics Vidhya; https://www.analyticsvidhya.com/blog/2018/04/solving-an-image-captioning-task-using-deep-learning/; Apr. 2, 2018.

Brownlee, Jason; "How to Automatically Generate Textual Descriptions for Photographs with Deep Learning;" Machine Learning Mastery; https://machinelearningmastery.com/how-to-caption-photos-with-deep-learning/; Nov. 13, 2017.

* cited by examiner

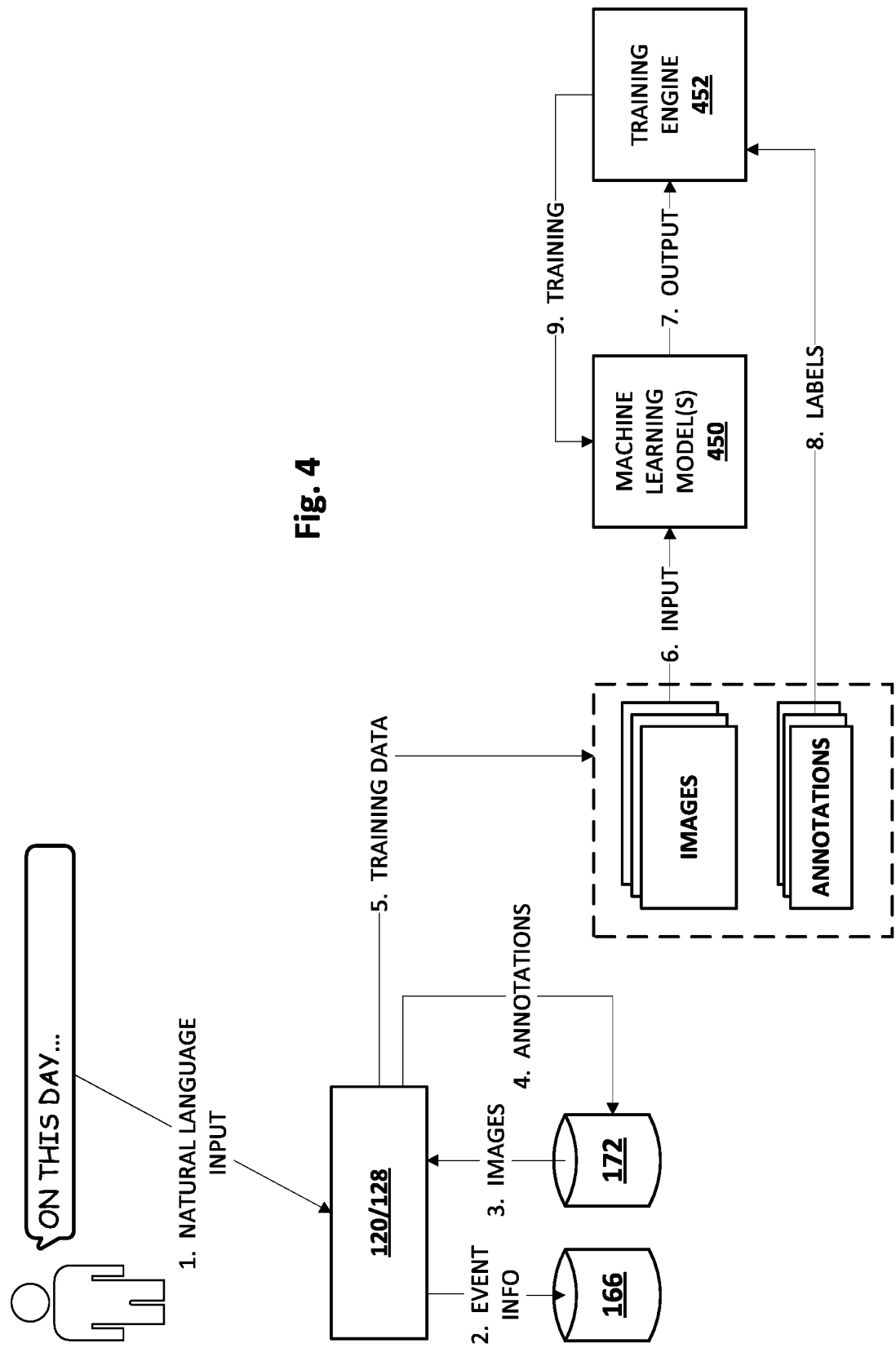

DIGITAL IMAGE CLASSIFICATION AND ANNOTATION

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input. Automated assistants may perform various types of processing on the natural language input, such as natural language processing, syntactic processing, semantic processing, etc., in order to identify and respond to the user's intent.

With the ever-growing ubiquity of mobile computing devices equipped with cameras, most individuals (also referred to herein as "users") acquire unmanageable amounts of digital images and/or digital videos (as used herein, "digital images" will include both digital still images and sequences of digital images forming digital videos). As a consequence of the increasing number of acquired digital images, methods for enabling efficient identification and retrieval of the images are increasingly beneficial.

Techniques exist for using various types of artificial intelligence to perform object and/or entity recognition on digital images and making those digital images searchable in a database based on the identified objects or entities, thereby to enable efficient retrieval of the digital images. In some cases, the identified objects and/or entities also may be used to automatically generate captions for digital images. However, performing object and/or entity recognition on digital images acquired by individuals is challenging considering the enormous and constantly changing search space of all potential objects and/or entities that can be captured in a digital image. Moreover, generic object recognition may only be capable of annotating digital images with information that is relatively impersonal and/or generic, and that lacks context.

SUMMARY

Techniques are described herein for automatically annotating or curating digital images using various signals generated by individual users, in addition to or instead of content of the digital images themselves, thereby to enable the digital images to be retrieved from a searchable database based on their annotations. In particular, techniques are described herein for identifying events associated with a user and automatically classifying/annotating images inferred to be related to those events. For example, in various implementations, a user may provide a natural language input, e.g., to an automated assistant executing at least in part on one or more computing devices operated by the user, that identifies an event associated with the user and a date associated with the event. Content of the natural language input may then be used to annotate at least some digital images (which as noted above may include digital video) acquired on the date, e.g., for storage in a searchable database. In some implementations, the annotations and associated digital images may then be used to train a machine learning image classifier to classify other digital images.

The user-provided natural language input need not necessarily be targeted towards or even directly related to any given digital image. In fact, the user's natural language input and acquisition of the digital images need not be even contemporaneous, and can be entirely non-contemporaneous (e.g., days, weeks, months, years apart). Rather, the user may simply wish to identify (flag) a particular date in the past or future. By signaling that a particular date occurred (or will occur) on that date, the user enables techniques described herein to facilitate automatic, "hands-off" annotation of digital images that are likely related to the event. This may in turn enable additional use cases, such as automated captioning of images, improved searching of images, improved image organization, automatic identification and/or tagging of individuals in digital images, etc.

Additionally, digital images annotated using techniques described herein may be used downstream to train and/or improve machine learning models. For example, a machine learning classifier such as a convolutional neural network may be trained using digital images that are labeled with annotations generated using techniques described herein. In addition to or instead of identifying objects that are typically associated with particular events (e.g., balloons and cakes are often found in birthday photos), these trained models may be able to identify events in a more holistic way, e.g., based on their overall similarity to other similarly-annotated photographs.

As an example, a user may state (vocally or by typed input) something like, "Tomorrow, my daughter Delia turns three." This natural language input may be analyzed, e.g., using a natural language and/or semantic processor, to identify the event ("Delia/daughter's birthday), the date associated with the event ("tomorrow," which may be resolved to a more standard date format), and one or more words or phrases that describe the event (e.g., "Delia," "birthday," "turns three", etc.). Natural language inputs such as these may be obtained from various computing interactions, such as the user making a statement to an automated assistant, the user updating his or her social networking status, etc.

Once the event associated with the user and associated data are identified, various signals related to the digital images acquired or otherwise obtained by the user on or near the determined date, and/or aspects of the digital images themselves, may be analyzed to automatically determine (i.e., without explicit user input) which digital images are associated with the event and which are not. The digital images determined to be associated with the event may be labeled or annotated, e.g., in a searchable database and/or in their metadata, with one or more of the word(s) (or "tokens") and/or phase(s) determined from the natural language input to be associated with the event.

Various signals may be analyzed to determine whether a given digital image captured on a date associated with an event should be classified/annotated as being related to the event. In some implementations, a record of user-controlled computing interactions with the digital image may be examined to determine whether it should be classified as being related to the event. For example, in some implementations, an amount of time each of the plurality of digital images was displayed via one or more graphical user interfaces may be determined. Images that were displayed the user and/or other users for longer periods of time than other images captured during the same day may be classified as being related to the event. Intuitively, if a user makes the effort to provide natural language input to his or her automated assistant flagging a particular event, it is more likely that the user and/or others viewed digital images related to the event than, say, other digital images captured during the same day that are likely of less significance.

Additionally or alternatively, in some implementations, a measure of image manipulation applied to each of the plurality of digital images via one or more digital image manipulation applications may be considered. For similar reasons as above, a user is more likely to manipulate (e.g., apply filters, crop, zoom in/out, etc.) a digital image associated with an event that has been specifically identified, e.g. to an automated assistant, than the user is to manipulate other images. Additionally or alternatively, in some implementations, a measure of sharing associated with each of the plurality of digital images may be determined. If a user shares one or more particular digital images captured on the same day as an identified event more than other digital images captured the same day, the particular images are more likely to be associated with the identified event. Likewise, if other users share the digital images between themselves, the shared digital images are more likely associated with an identified event in the originally-sharing user's life.

Additionally or alternatively, in some implementations, various types of image recognition processing may be performed on a plurality of digital images captured on the date to identify one or more objects or entities associated with the event that are depicted in a subset of the plurality of digital images. Various types of image processing may be employed, such as object recognition, facial recognition, entity recognition, etc. For example, if an identified event associated with the user is a child's graduation, then digital images depicting objects known to be associated with graduations, such as caps, gowns, large crowds, podiums, etc., may be automatically classified/annotated as being related to the graduation. Other images captured on the same date that depict non-graduation-related objects, such as images taken at a farmer's market, may not be so classified/annotated.

In various implementations, the image processing may be biased towards recognition of one or more of the tokens related to the event, and/or to other objects/entities known to be related to the tokens by virtue of a knowledge graph. For example, objects detected in an image may be segmented and applied individually as input across a trained machine learning model such as a convolutional neural network. The output may be embeddings of the individual objects in latent/semantic space. These embeddings may then be examined for semantic similarity (e.g., distance in the latent space) with other semantic embeddings related to birthdays, such as "cake," "presents," "clowns," etc. The object embeddings generated from the digital image that are the most similar to birthday-related concepts in the latent space may be boosted over other, non-birthday related object embeddings generated from the digital image. Additionally or alternatively, if a particular object is similarly distanced from two different embeddings relating to two different types of events, the contextual information determined from the user's natural language input may be used to break the tie.

In various implementations, a combination of the aforementioned signals may be used to automatically classify/annotate digital images as being related to an event associated with the user. In some such implementations, each contributing signal may increase an aggregate measure of confidence that a digital image should be classified as being related to an event associated with the user. If the aggregate measure of confidence for a given digital image satisfies some threshold (e.g., manually set, learned over time, etc.), the given digital image may be classified/annotated as being related to the event.

For example, suppose a user identifies a kindergarten graduation, e.g. to their automated assistant. A kindergarten graduation may not feature many objects typically associated with graduations generally, such as caps and/or gowns. However, images of kindergarten graduations may include other, weaker signals of graduation, such as crowds, podiums, etc. By themselves these signals may not suffice to classify/annotate a digital image as being related to a kindergarten graduation. However, suppose the digital image is also displayed on a graphical user interface to the parent-photographer for a longer amount of time than other digital images captured that day, and/or the parent shares the digital image with more users (e.g., grandparents) than other digital images captured that day. In some implementations, an aggregate measure of confidence that the digital image is related to the kindergarten graduation that is calculated based on multiple sets of signals (e.g., detected crowd and podium, heightened display time, the user-provided natural language input) may satisfy a threshold, resulting in the digital image being classified/annotated as related to the kindergarten graduation.

As another example, suppose other digital images are captured within a relatively short time window as a particular digital image classified/annotated as being related to the kindergarten graduation. These other photos might not necessarily have, by themselves, strong signals of being related to the kindergarten graduation. For example, if several family members are present at the kindergarten graduation, they may take a group photo in the hallway or outside that doesn't even include the kindergarten graduate. Nonetheless, because acquisition of these other digital images was temporally proximate to acquisition of the annotated digital image, these other digital images may also be annotated as related to the kindergarten graduation.

In addition to or instead of temporal proximity to classified/annotated digital images, other signals also may be utilized to classify otherwise ambiguous digital images as related to particular events. Continuing the kindergarten graduation example, position coordinates (e.g., geotags) associated with other digital images captured on the same day may be associated with the kindergarten graduation—even if they themselves do not provide strong signals of being related to the graduation—based on their spatial proximity to other digital images more strongly associated with the kindergarten graduation.

Techniques described herein can be used to annotate digital images with other information besides being related to events associated with a user. For example, in some implementations, techniques described herein may be used to automatically recognize and/or tag individuals in digital images. Many digital image libraries may undergo facial clustering to identify clusters of identical faces depicted across multiple digital images acquire by a user. However, unless the user tags an individual's face in one or more images, these facial clusters may remain anonymous. With techniques described herein, user-provided signals such as natural language input identifying an event related to a particular individual may be used to automatically assign an identity to a heretofore anonymous facial cluster. Suppose a father says, e.g., to an automated assistant, "Redmond took his first steps last Saturday." Digital images (or digital videos) acquired on that date may be classified/annotated using techniques described herein. A child that is repeatedly depicted in these classified/annotated images may be matched to a heretofore anonymous facial cluster. Then, because "Redmond" was identified by the user, the identifier "Redmond" may be assigned to the facial cluster, so that it is no longer anonymous.

Techniques described herein give rise to various technical advantages. For example, automatically classifying/annotating digital images using techniques described herein may make a library of digital images more robustly searchable, as digital images can now be searched based on events associated with a user that might not otherwise be identifiable based on objects/entities recognized in the images themselves. In addition, the techniques described herein may reduce the amount of user inputs (or more generally, work) required to organize the library of digital images.

As another example, automatically determining the identity of an individual associated with a facial cluster may facilitate automated tagging of that individual in past and/or future digital images. By tagging the individual images with the individual's identity, it is them possible to search the digital image database by the individual's identity and automatically generate captions that feature the individual's identity. Moreover, once the individual is tagged in a particular digital image, it may become easier to classify/annotate that digital images using techniques described herein. For example, and using the example above related to Delia's birthday, suppose Delia is depicted in a digital image captured on her birthday (the fact which may be determined from a parent's natural language input, "Tomorrow is Delia's third birthday"). The fact that Delia is identified in a digital image captured on her birthday may serve as a strong signal that the digital image should be classified/annotated as related to her birthday.

As another example, and as described previously, digital images annotated using techniques described herein may be usable as training data to train (e.g., from scratch or improve) downstream machine learning models/classifiers. For example, the classifiers may be trained to identify events depicted in digital images holistically, e.g., based on the digital images' overall similarity to other similar digital images with the same context, rather than based (exclusively) on recognizing individual objects/entities in the images. Once trained, these machine learning models may be able to automatically annotate subsequent digital images even without the benefit of user-provided input identifying the event. For example, a different user's digital images captured at a different kindergarten graduation may nonetheless annotated as related generally to graduations, even if the different user did not provide any sort of signal that the kindergarten graduation occurred or was going to occur.

In some implementations, a method performed by one or more processors is provided that includes: obtaining a natural language input provided by the user via one or more input components of a computing device, wherein the natural language input is directed by the user to an automated assistant executing at least in part on the computing device; analyzing the natural language input to determine an event associated with the user, one or more tokens of the natural language input that describe the event, and a date associated with the event; identifying a plurality of digital images captured on the date; examining a record of user-controlled computing interactions associated with the identified plurality of digital images; based on the examining, classifying a subset of the plurality of digital images captured on the date as being related to the event, wherein other digital images of the plurality of digital images captured on the date are not classified as being related to the event; and storing, in a searchable database, data indicative of one or more of the tokens that describe the event in association with the subset of the plurality of digital images that were classified as being related to the event, wherein the digital images in the searchable database are searchable based on the one or more tokens that are stored in association with the digital images.

In various implementations, the obtaining may include: receiving, by the automated assistant, via the one or more input components of the computing device, an audio recording of an utterance by the user directed to the automated assistant; and performing speech-to-text processing on the audio recording to generate the natural language input.

In various implementations, the examining may include determining an amount of time each of the plurality of digital images was displayed via one or more graphical user interfaces. In various implementations, the amount of time a given digital image of the plurality of digital images was displayed may include a cumulative amount of time the given digital image was displayed across the one or more graphical user interfaces. In various implementations, the one or more graphical user interfaces may include a plurality of graphical user interfaces rendered on a plurality of different displays, and the cumulative amount of time the given image was displayed may include a cumulative amount of time the given image was displayed across the plurality of graphical user interfaces.

In various implementations, the examining may include determining a measure of image manipulation applied to each of the plurality of digital images via one or more digital image manipulation applications. In various implementations, the examining may include determining a measure of sharing associated with each of the plurality of digital images. In various implementations, the measure of sharing associated with a given digital image of the plurality of digital images may include a count of shares of the given digital image by a user who captured the given digital image to a plurality of other users. In various implementations, the measure of sharing associated with a given digital image of the plurality of digital images may include a count of shares of the given digital image across a plurality of other users.

In various implementations, the method may further include formulating, based on the one or more tokens that describe the event, a natural language caption for each of the subset of digital images. In various implementations, the method may further include applying one or more digital images of the subset of digital images as input across a machine learning classifier to generate an output; comparing the output to the one or more tokens that describe the event to generate an error; and training the machine learning classifier based on the error, wherein the training configures the machine learning classifier to classify subsequent digital images as being related to the one or more tokens that describe the event.

In various implementations, the method may further include: performing image recognition processing on the identified plurality of images captured on the date to identify one or more objects or entities associated with the event that are depicted in a subset of the plurality of digital images, wherein the performing includes biasing the image recognition processing towards recognition of one or more of the tokens related to the event; wherein the classifying is further based on the identified one or more objects or entities.

In another aspect, a method implemented using one or more processors may include: obtaining a natural language input provided by a user via one or more input components of a computing device; analyzing the natural language input to determine an event associated with the user, one or more tokens that describe the event, and a date associated with the event; identifying a plurality of digital images captured on the date; performing image recognition processing on the identified plurality of images captured on the date to identify one or more objects or entities associated with the event that are depicted in a subset of the plurality of digital images, wherein the performing includes biasing the image recognition processing towards recognition of one or more of the tokens related to the event; classifying the subset of the plurality of digital images as being related to the event, wherein other digital images of the plurality of digital images captured on the date that do not depict the one or more objects or entities are not classified as being related to the event; and storing, in a searchable database, data indicative of one or more of the tokens that describe the event in association with the subset of the plurality of digital images that were classified as being related to the event.

In various implementations, the obtaining may include: receiving, by the automated assistant, via the one or more input components of the computing device, an audio recording of an utterance by the user directed to the automated assistant; and performing speech-to-text processing on the audio recording to generate the natural language input.

In various implementations, the method may further include formulating, based on the one or more tokens that describe the event, a natural language caption for each of the subset of digital images.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 schematically depicts an example of how images may be annotated using techniques described herein and then used to train downstream machine learning models for holistic context/theme classification.

DETAILED DESCRIPTION

Figure 1:
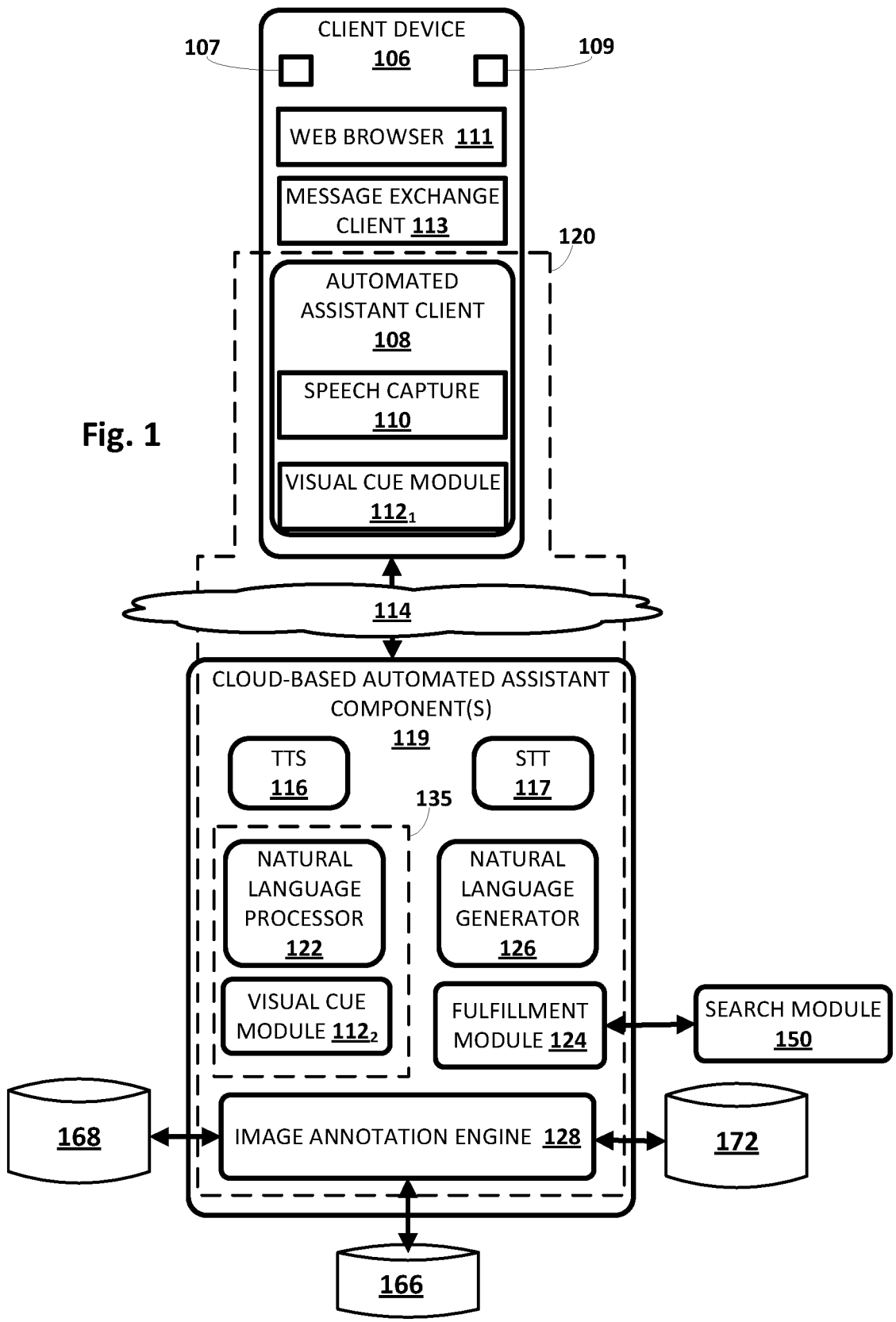
FIG. 1 depicts an example environment in which selected aspects of the present disclosure may be implemented.

In FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to perform various actions.

Automated assistant 120 may engage in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant." When spoken, this verbal input may be captured by a microphone 109 and may cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110 and/or a visual cue module $112_1$. In other implementations, one or more aspects of speech capture module 110 and/or visual cue module 112 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as microphone 109 or other pressure sensor to capture an audio recording of a user's utterance(s). Various types of processing may be performed on this audio recording for various purposes.

In various implementations, visual cue module $112_1$ (and/or cloud-based visual cue module $112_2$) may be implemented using any combination of hardware or software, and may be configured to analyze one or more image frames provided by vision sensor(s) 107 to detect one or more visual cues captured in and/or across the one or more image frames. Visual cue module $112_1$ may employ a variety of techniques to detect visual cues. For example, visual cue module $112_1$ (or $112_2$) may use one or more artificial intelligence (or machine learning) models that are trained to generate output indicative of detected user-provided visual cues in image frames.

Client device 106 may have other applications installed as well, such as a web browser 111 and/or a message exchange client 113. Message exchange client 113 may come in various forms. In some implementations, message exchange client 113 may come in the form of a short messaging service ("SMS") and/or multimedia messaging service ("MMS") client, an online chat client (e.g., instant messenger, Internet relay chat, or "IRC," etc.), a messaging application associated with a social network, and so forth. In some implementations, message exchange client 113 may be implemented within a webpage rendered by web browser 111. In various implementations, message exchange client 113 may provide an interface for a user to engage in typed or spoken human-to-computer dialog with automated assistant 120, as a one-on-one dialog or as a multi-participant dialog in which automated assistant 120 may "participate."

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user. Free form natural language input may be spoken (and captured by microphone 109) and/or typed (e.g., into one or more interfaces provided by one or more applications, such as message exchange client 113).

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather | forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a latent space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "On this day Delia turns this many" while the user or Delia holds up three fingers to visual sensor 107 of client device 106. Or, a user could utter something like "Find me more movies like this" while holding of a DVD case for a particular movie.

Fulfillment module 124 may be configured to receive the predicted/estimated intent that is output by intent matcher 135, as well as an associated slot values (whether provided by the user proactively or solicited from the user) and carry out (or "resolve," or "fulfill") the intent. In various implementations, fulfillment (or "resolution" or "carrying out") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some Figs.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oregon." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc. In some implementations, fulfillment module 124 may generate, e.g., as fulfillment information, data indicative of an event associated with a user, e.g., for storage in an automated assistant history database 166.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Various aspects of the present disclosure may be implemented in whole or in part by image annotation engine 128. In general, image annotation engine 128, alone or in combination with other components of automated assistant 120, may be configured to obtain a natural language input provided by the user via one or more input components of client device 106. The natural language input may be directed by the user to automated assistant 120, or it may be directed elsewhere, such as towards a social media status update. Image annotation engine 128, alone or in combination with other components of automated assistant 120, may be further configured to analyze the natural language input to determine an event associated with the user, one or more tokens of the natural language input that describe the event, and a date associated with the event.

Image annotation engine 128, alone or in combination with other components of automated assistant 120, may be further configured to identify, e.g., in an image repository 172 (e.g., a searchable database of digital images, e.g., acquired by a user), a plurality of digital images captured on the date. Image annotation engine 128, alone or in combination with other components of automated assistant 120, may be further configured to examine a record of user-controlled computing interactions, e.g., stored in interaction records database 168, with the identified plurality of digital images. Based on the examining, image annotation engine 128, alone or in combination with other components of automated assistant 120, may be further configured to classify a subset of the plurality of digital images captured on the date as being related to the event. Other digital images of the plurality of digital images captured on the date may not be classified as being related to the event. Image annotation engine 128, alone or in combination with other components of automated assistant 120, may be further configured to store, in searchable image repository 172 (also referred to herein as a "database"), data indicative of one or more of the tokens that describe the event in association with the subset of the plurality of digital images that were classified as being related to the event.

As noted above, image annotation engine 128 may have access to multiple databases and/or indexes, such as automated assistant history database 166, interaction records database 168 and/or searchable image repository 172. Automated assistant history database 166 may store logs and/or other data (e.g., transcripts, topics, themes, etc.) indicative of past conversations with automated assistant 120. In some implementations, techniques described herein may utilize information stored in database 166 to identify events associated with the user and/or to trigger digital image analysis for purposes of annotation. Interaction records database 168 may store (at least temporarily) records of user-controlled interactions with digital images. User-controlled interactions with images may include, for example, user manipulation of images, user sharing of images, user "surfacing" of images (e.g., displaying the images in a graphical user interface), and so forth. Image annotation engine 128 also may have access to searchable image repository 172, which may store digital images acquired by one or more users. For example, many users sign in their mobile devices to online accounts that provide, among other things, backup functionality for photographs.

Figure 2A:
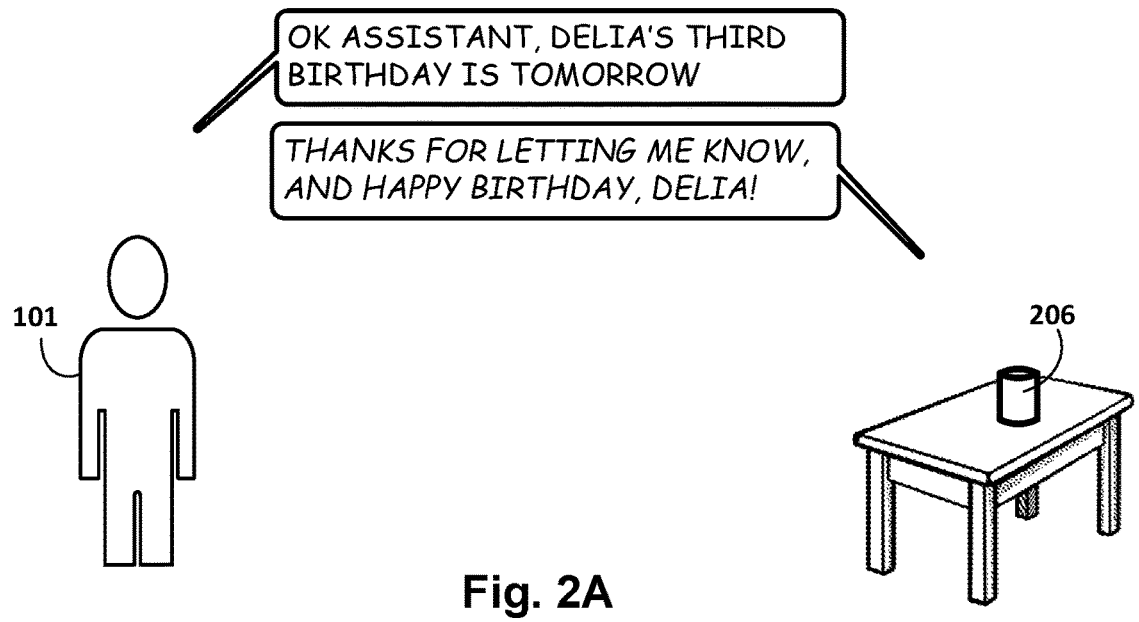
FIGS. 2A and 2B schematically depict an example of how techniques described herein may be employed to annotate digital images based on user-provided natural language input.
Figure 2B:
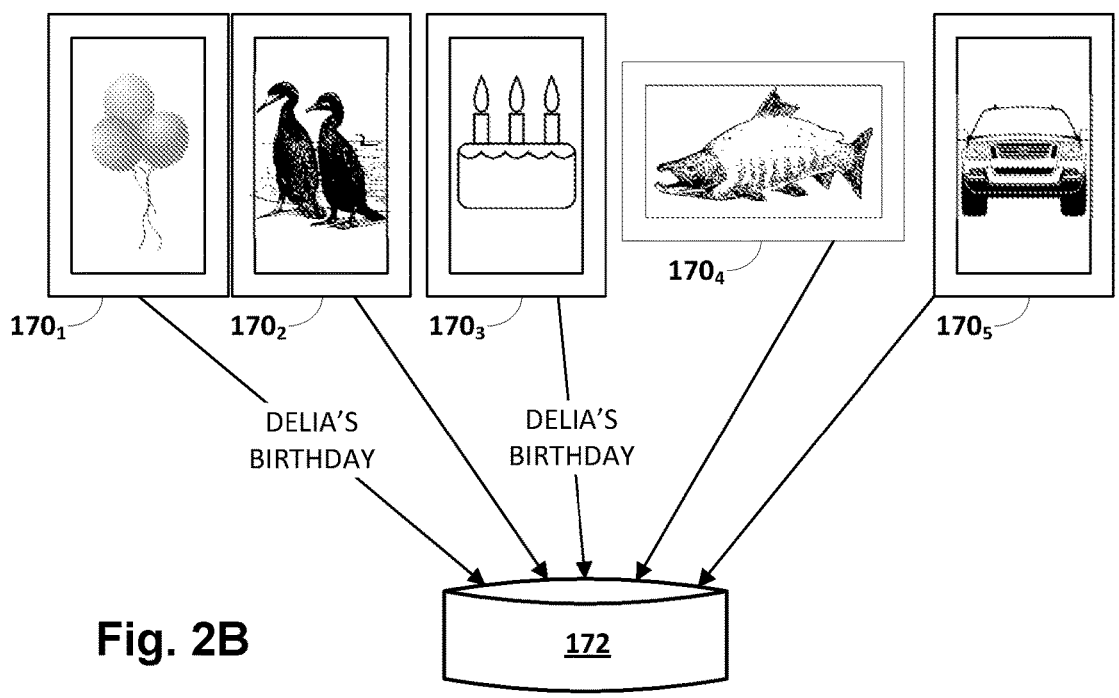

FIGS. 2A and 2B depict an example of how techniques described herein may be employed to annotate digital images with contextual information based on natural language input provided by a user. In FIG. 2A, a user 101 is interacting with automated assistant 120 that executes at least in part on a client device 206. In FIG. 2A, client device 206 takes the form of a standalone interactive speaker. However, this is not meant to be limiting, and any other type of client device that is operable to engage in natural language dialog with automated assistant 120 may be employed, such as a smart phone, smart appliance (e.g., television), laptop computer, tablet computer, vehicle computing system, smart watch, smart glasses, etc.

In FIG. 2A, user 101 invokes the automated assistant by saying, "OK, Assistant," and then provides the natural language input, "Delia's third birthday is tomorrow." While user 101 provides this statement vocally, this is not meant to be limiting, and it should be understood that user 101 can provide natural language input to an automated assistant using typed input as well.

In some implementations, an audio recording of the statement of user 101 may be processed, e.g., using STT processing, to generate textual natural language input, which in this case is "Delia's third birthday is tomorrow." The natural language input may then be analyzed, e.g., as described above with respect to FIG. 1, to determine an event associated with user 101, as well as a date associated with the event and, if provided by user 101, one or more other word(s) or phrase(s) that describe the event. In the example of FIG. 2A, the event is "Delia's birthday," the date is "tomorrow" (which may be resolved to a more standardized date/time), and one or more words/phrases that described the event include "third birthday."

Now, suppose tomorrow arrives and user 101 operates one or more client devices (e.g., a mobile phone, smart watch)—or even non-smart devices such as digital cameras—to capture a plurality of digital images $170_{1-5}$. Techniques described herein may be employed to selectively classify and annotate images 170 as being related to the event. Images acquired on the same day that do not appear relevant may not be classified and annotated as relevant.

For example, in FIG. 2B, images $170_1$ and $170_3$ include objects typically known to be associated with birthdays, including balloons ($170_1$) and cake ($170_3$). By contrast, the other digital images depict birds ($170_2$), a fish ($170_4$) and a vehicle ($170_5$)—objects not typically associated with birthdays. Consequently, images $170_1$ and $170_3$ are stored in a database 172 (e.g., cloud-based photo repository, on-device photo repository, etc.) in association with data indicative of one or more of the tokens ("Delia's third birthday") that describe the event. The other images $170_2$, $170_4$, and $170_5$, may be stored in database 172, but without any annotation or accompanying data indicating that they are related to the event.

Suppose instead of it being Delia's third birthday, user 101 indicates that tomorrow is Delia's sixteenth birthday. In the United States, many states allow issuance of driver's licenses at sixteen. In some implementations, the fact that it is Delia's sixteenth birthday, rather than her third birthday, may impact which digital images are classified as related to her birthday. For example, image $170s$ depicts a vehicle. It might be that Delia received, as a birthday present, the depicted vehicle, or her parents/friends may capture an image of the vehicle because Delia is behind the wheel. In any case, because an event "sixteenth birthday" often has, at least in the United States, a significance related to driving, digital image $170_s$ may be classified/annotated as being related to Delia's sixteenth birthday.

In various implementations, the image processing performed by image annotation engine 128 may be biased towards recognition of one or more of the tokens related to the event. For example, in FIG. 2B, the image processing may be biased towards recognition of various objects and/or entities known to be related to birthdays, e.g., by virtue of a knowledge graph. For example, a digital image may be segmented based on detected objects. Each of the detected objects may be used to generate a latent space (i.e. semantic space) embedding, e.g., using a trained machine learning model such as a convolutional neural network. Then, the embedding(s) distances (e.g., Euclidian distance) to other embeddings in the latent space may be determined, e.g., to identify the N closest embeddings (N being a positive integer). Then, the N closest embeddings may be ranked based on their distances to birthday-related embeddings, such as tokens contained in the natural language input (birthday), or other tokens/topics determined from a knowledge graph to be related to birthdays.

Continuing with the above example, suppose a digital image captured on Delia's birthday depicts some balloons, a chair, a table, and a coffee maker. These objects may be segmented from the image and used to generate respective embeddings into the latent space. These embeddings may be usable to recognize the objects. For example, the chair embedding will be relatively close to other chair embeddings, the coffee maker embedding will be relatively close to other coffee make embeddings, and so forth. Only the balloons are particularly relevant to birthdays. Accordingly, the embeddings may be ranked based on their relatedness to birthdays (or birthday-related concepts determined from a knowledge graph), and/or their relationships may be boosted based on concepts associated with birthdays. For example, the balloons embedding may be similar distances in latent space from both birthdays and carnivals (events at which balloons are common). However, the token "birthday" taken from user's 101 natural language input may be used to boost the relationship of balloons with birthdays over the relationship of balloons with carnivals. More generally, the contextual information gleaned from the user's natural language input may be used to "break a tie" between similarly distanced but semantically distinct embeddings in the latent space.

Figure 3A:
FIGS. 3A and 3B schematically depict another example of how techniques described herein may be employed to annotate digital images based on user-provided natural language input.
Figure 3B:
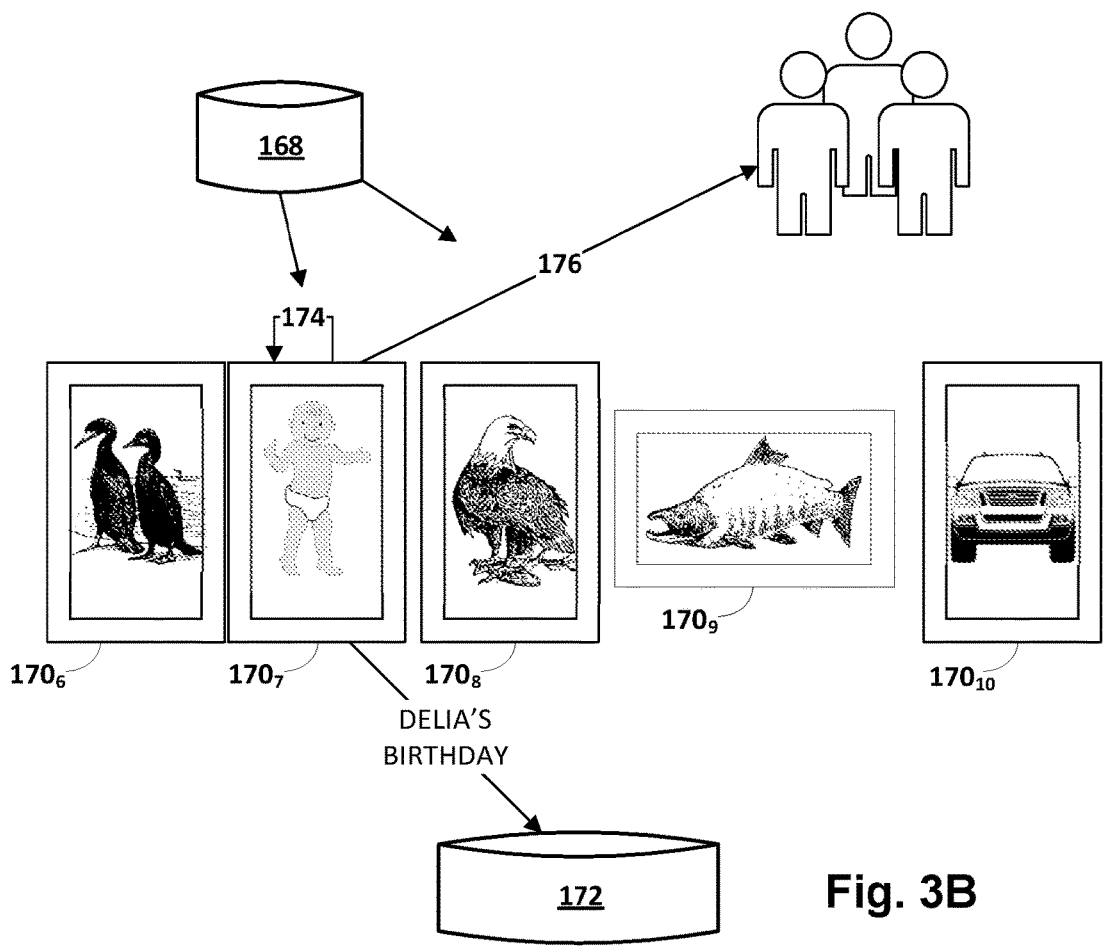

FIGS. 3A-3B depict another example in which techniques described herein may be employed to automatically classify/annotate digital images as being related to a user-identified event. While the same client device 106 and user 101 are depicted in FIGS. 3A-B as were depicted in FIGS. 2A-2B, this is not meant to be limiting. In FIG. 3A, user 101 identifies an event in the past, stating, "Yesterday, Delia took her first steps." This is notably different than FIGS. 2A-B, in which user 101 identified a future event. Because the event occurred in the past, techniques described herein may be employed immediately (or periodically, or any other time) to determine which digital images captured by user 101 yesterday were related to this event.

In FIG. 3B, image annotation engine 128 is able to identify, in image repository, five digital images $170_{6-10}$ that were taken yesterday. These images $170_{6-10}$ depict, respectively, birds, a baby walking, another bird, a fish, and a vehicle. Although object/entity recognition techniques similar to those described previously could be employed to recognize image $170_7$ as depicting a baby walking, other techniques may be used instead (or in addition). For example, in FIG. 3B, image annotation engine 128 may examine a record of user-controlled computing interactions (e.g., in database 168) with digital images to determine that, for instance, user 101 manipulated (e.g., zoomed in or out, cropped, applied filter, etc.) image $170_7$ at 174. Additionally, at 176, user 101 shared image $170_7$ with a plurality of other users, e.g., using text messaging, social media, etc. Based on this examining, image annotation engine 128 may classify digital image $170_7$ as being related to the event (Delia first steps), wherein the other digital images $170_6$ and $170_{8-10}$ are not classified as being related to the event.

In various implementations, a variety of different user-controlled computing interactions with digital images may be considered, alone or in combination with other user-controlled computing interactions, when determining whether digital images should be classified as being related to an event identified by the user, e.g. to automated assistant. In some implementations, an amount of time each digital image was displayed via one or more graphical user interfaces may be considered. For example, if the user that acquired the image, or one or more other users, loads and views the image (i.e. the image is displayed) for longer periods of time than other images acquired the same day, that likely indicates that the displayed image is significant. If an event is identified on the same day as the image was acquired, that might suffice, alone or in combination with other signals described herein, to classify/annotate the digital image as relevant to the event. The amount of time an image was displayed may be calculated in various ways, such as a highest cumulative amount of time the given digital image was displayed on any given graphical user interface, or a cumulative amount of time the given image was displayed across multiple graphical user interfaces.

As alluded to above, another user-controlled interaction measure may be a measure of image manipulation applied to the digital images via a digital image manipulation application. Heavy user-controlled manipulation of a particular digital image may indicate that the digital image is, perhaps, more significant to the manipulating user(s) than other images. A user may manipulate a digital image in various ways using various types of digital image manipulation applications. The user may apply one or more filters to alter a general appearance of the image. Additionally or alternatively, the user may zoom in and/or out in the digital image, either just to look more closely at the image and/or to create a modified image. Additionally or alternatively, the user may crop the image, apply various touchups to the image (e.g., smug, blur, color swap, etc.).

Yet another user-controlled interaction measure may include determining a measure of sharing associated with each of the plurality of digital images. As shown in FIG. 3B, a particular digital image being shared at 176 with others to a greater degree than other digital images may indicate that the particular digital image is relatively significant. Various measures of sharing may be employed in various implementations. For example, a number or count of times a given digital image was shared by a user who captured the given digital image to a plurality of other users may be determined. Additionally or alternatively, in some implementations, a measure of sharing associated with a given digital image may include a count of shares of the given digital image across multiple other users, e.g., irrespective of the user that acquired the image. For example, an image that goes "viral" amongst family members may be classified as related to a particular event.

In various implementations, a combination of the aforementioned signals may be used to automatically classify/ annotate digital images as being related to an event associated with a user. In some such implementations, each contributing signal may increase an aggregate measure of confidence that a digital image should be classified as being related to the event. If the aggregate measure of confidence for a given digital image satisfies some threshold (e.g., manually set, learned over time, etc.), the given digital image may be classified/annotated as being related to the event. For example, both object recognition and user-controlled interactions may be examined collectively to determine that a particular image is likely significant to a user, and hence, likely related to an event identified by the user.

As another example, suppose a user provides a natural language statement such as "Tomorrow, I'm going to begin rebuilding an engine." When tomorrow arrives, the user may capture digital images of the engine prior to disassembly, as well as digital images of the constituent engine parts as the user disassembles the engine. Using techniques described herein, digital images captured that day may be analyzed, e.g., using records of user-controlled interactions with digital images and/or object recognition, to classify and annotate digital images associated with disassembly of the engine. For example, images depicting individual engine parts may be used to generate embeddings in in latent space, e.g., using a convolutional neural network. These embeddings likely will be closer to (and hence, semantically similar to) embeddings relating to engines, parts, etc. By contrast, other images captured that day, e.g., of vegetables at a farmer's market, of a child's birthday party, etc., may generate embeddings that are distant from engine-related embeddings. Consequently, the digital images of the whole engine and its constituent parts may be automatically annotated as being related to the event, "engine rebuild." These images may be searched for later in association with "engine rebuild," e.g., so that the user can use those images to help in reassembling the engine.

Techniques described herein are not limited to classifying/ annotating images based on natural language input provided by a user to automated assistant 120. Other sources of natural language input can be used in addition to or instead of assistant-directed dialog. For example, a user could send electronic correspondence (e.g., text message, email, etc.) to another user describing an event in the past or future. Or, a user could post natural language input describing an event to their social networking page, e.g., with or without uploading digital images related to the event. In some implementations, if a user posts a single picture in relation to an event on social media, other images captured that day (or within a smaller time interval contemporaneous with the event) may also be classified/annotated as related to the event.

FIG. 4 schematically depicts an example of how downstream machine learning models may be trained to identify the context of digital images using training data that includes images annotated using techniques described herein. First, a user provides some natural language input that identifies an event associated with a user and a date associated with the event. For example, the user could speak a phrase such as "On this day, I got my black belt in karate." The tokens "On this day" may signify that an event which can be used for annotating digital images has occurred or will occur today. Alternatively, the user could have identified a date in the past or future. The remainder of the user's natural language input identifies the event as being receipt of a black belt in karate. At step 1 this natural language input (or other data indicative thereof, such as an embedding) may be provided to automated assistant 120 and/or image annotation engine 128.

At step 2 of FIG. 4, automated assistant 120 and/or image annotation engine 128 may store information about the event, such as its date and/or one or more user-provided tokens that describe the event, in automated assistant history database 166. At step 3, one or more images acquired on the date associated with the event may be retrieved, e.g., from searchable image repository 172. At step 4, techniques described herein may be performed to identify which of the images retrieved at step 3 are pertinent to the event, and which likely are not. The digital images identified as pertinent to the event may be classified as such. At step 4, annotations related to the event may be generated and stored in searchable image repository 172 (or in another database, or as metadata). These annotations may include, for instance, one or more tokens spoken by the user, natural language output generated by natural language generator 126 based on those tokens, etc.

At step 5 of FIG. 4, which may be performed at any point in time after at least some digital images in searchable image repository 172 are annotated using techniques described herein, one or more digital images and/or their accompanying annotations may be provided as training data. As shown in step 6 of FIG. 4, the digital images themselves may be applied as input across one or more machine learning models 450, such as one or more convolutional neural networks, for purposes of training those models. The machine learning model(s) 450 may generate output at step 7. The output may be provided to a training engine 452, which may be implemented using any combination of hardware or software. At step 9, training engine 452 may be configured to compare the output of step 7 to labels provided at step 8. The labels may be the annotations that were generated using techniques described herein. In various implementations, a difference between the output and the labels (or "error") may be used to train the machine learning model(s), e.g., using various training techniques such as gradient descent, back propagation, and so forth.

Once machine learning model(s) 450 are trained, they may be configured to generate output that is indicative of an overall context of a digital image. In particular, a non-labeled digital image may be applied as input across one or more of the trained machine learning models 450 to generate output. The output may be indicative of a context or other topic or theme of the image. In sum, machine learning model(s) 450 are trained with annotations generated from user-provided natural language input, including natural language input that is not necessarily targeted at a particular digital image when the input is provided. As a consequence, trained machine learning model(s) 450 may be configured to "holistically" classify digital images based on their semantic, thematic, and/or topical similarity to other digital images captured in similar contexts, rather than similarity strictly based on shared depicted objects.

Figure 5:
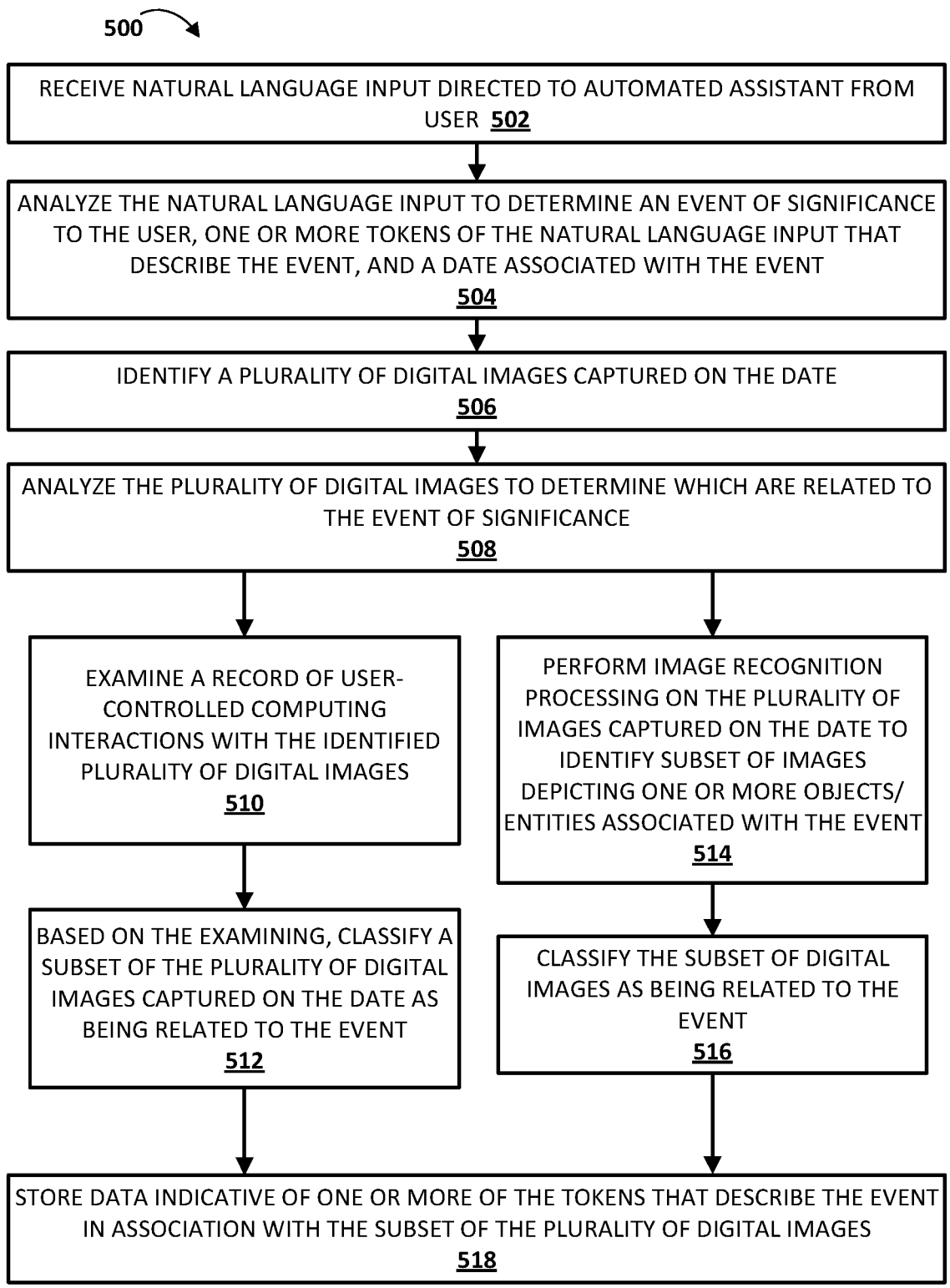
FIG. 5 depicts a flowchart illustrating an example method according to implementations disclosed herein.

FIG. 5 is a flowchart illustrating an example method 500 according to implementations disclosed herein. For convenience, the operations of the flow chart are described with reference to a system that performs the operations. This system may include various components of various computer systems, such as one or more components of automated assistant 120 and/or image annotation engine 128. Moreover, while operations of method 500 are shown in a particular order, this is not meant to be limiting. One or more operations may be reordered, omitted or added.

At block 502, the system may obtain a natural language input provided by the user via one or more input components of a computing device. In various implementations, the natural language input may be directed by the user to an automated assistant executing at least in part on the computing device. At block 504, the system may analyze the natural language input to determine an event associated with the user, one or more tokens of the natural language input that describe the event, and a date associated with the event.

At block 506, the system may identify a plurality of digital images captured on the date. As noted previously, this date need not be contemporaneous with provision of the natural language input. In some cases, the natural language input can identify a date in the past, which might immediately trigger techniques described herein. Additionally or alternatively, the natural language input may identify a date in the future, in which case techniques described herein may be triggered on that date, at the end of the day on that date, the next day, etc.

At block 508, the system may analyze the plurality of digital images in order to determine which are related to the event determined at block 504. This can be done in various ways. For example, at block 510, the system may examine a record of user-controlled computing interactions (e.g., 168) associated with the identified plurality of digital images. As noted previously, various types of user-controlled computing interactions may be considered, such as a measure of time digital images are displayed by one or more graphical user interfaces, a measure of sharing, a measure of image manipulation, etc. Based on the examining, at block 512, the system may classify a subset of the plurality of digital images captured on the date as being related to the event. Other digital images of the plurality of digital images captured on the date may not be classified as being related to the event.

Additionally or alternatively, at block 514, which may or may not execute in parallel with blocks 510-512, the system may perform image recognition processing on the plurality of images captured on the date to identify one or more objects and/or entities associated with the event that are depicted in a subset of the plurality of digital images. Various types of object/entity recognition may be employed, including but not limited to one or more convolutional neural networks as described previously, appearance based methods, feature-based methods, interpretation trees, pattern matching, scale-invariant feature transform ("SIFT"), speeded-up robust feature ("SURF"), principle component analysis, linear discriminant analysis, and so forth. Also, as noted previously, in some implementations, the image recognition processing may be biased towards recognition of one or more of the tokens related to the event. At block 516, similar to block 512, the system may classify the subset of digital images as being related to the event. Additionally or alternatively, in some implementations, the system may identify an overlap between the subset of digital images classified in block 512 and the subset of images classified at block 516. The digital images identified in both sets may be classified as related to the event. Additionally or alternatively, confidence measures associated with each digital image may be accumulated based on both paths (510-512 and 514-516).

Whether one or both of operational paths 510-512 and 514-516 are performed, at block 518, the system may store, e.g., in searchable image repository 172, data indicative of one or more of the tokens that describe the event in association with the subset of the plurality of digital images that were classified at block 512 and/or 516 as being related to the event. Thereafter, searchable image repository 172 may be indexed and/or searchable on these tokens.

While not depicted in FIG. 5, various downstream operations may be performed once the digital images are annotated using techniques described herein. For example, in some implementations, the system may formulate, based on the one or more tokens that describe the event, a natural language caption for one or more digital images of the subset of digital images. This may be performed, e.g., by natural language generator 126 or another similar component, upon user request (e.g., when creating a digital scrapbook), periodically, etc. Additionally or alternatively, in some implementations, the annotations that are stored in association with the classified digital images may themselves be full captions, although this is not required.

As another example, and as was depicted in FIG. 5, the system may apply one or more annotated digital images as input across a machine learning classifier (or machine learning model) to generate output, compare the output to the one or more tokens that describe the event to generate an error, and train the machine learning classifier based on the error, wherein the training configures the machine learning classifier to classify subsequent digital images as being related to the one or more tokens that describe the event.

Figure 6:
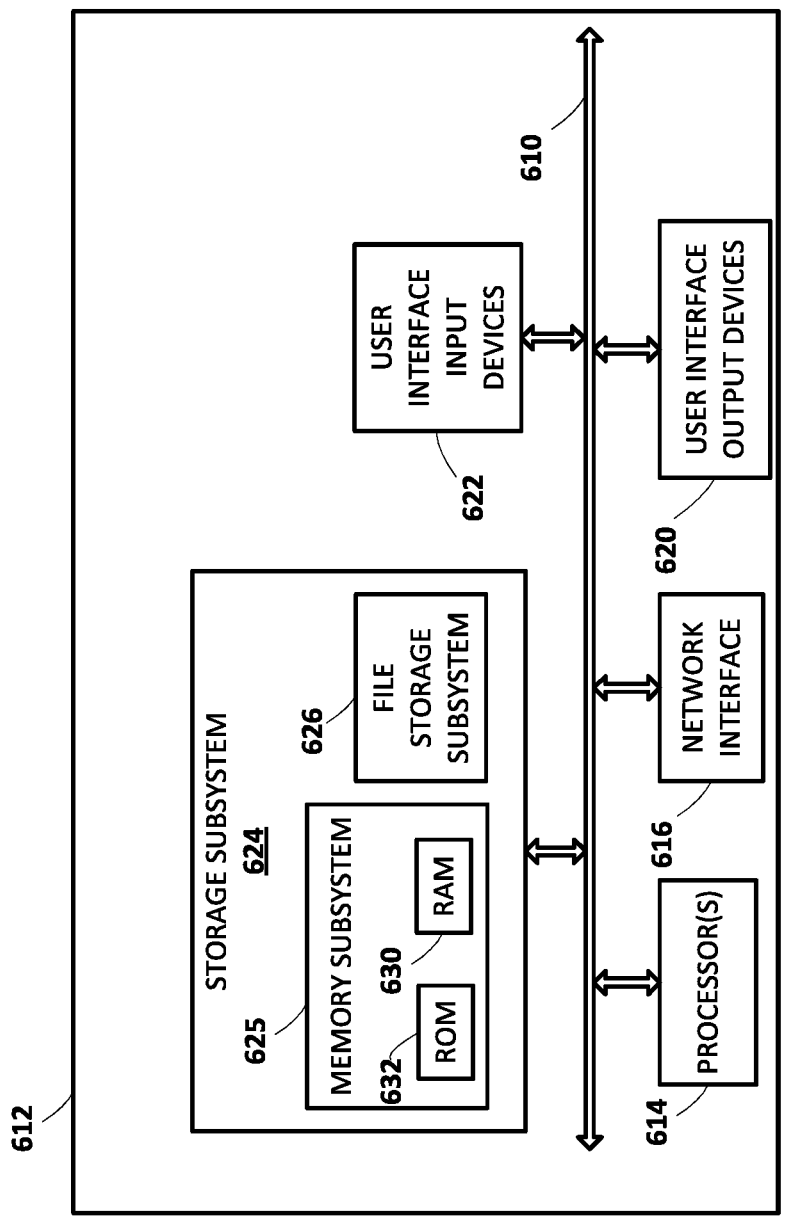
FIG. 6 illustrates an example architecture of a computing device.

FIG. 6 is a block diagram of an example computing device 610 that may optionally be utilized to perform one or more aspects of techniques described herein. In some implementations, one or more of a client computing device, image annotation engine 128, automated assistant 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining a natural language input provided by a user via one or more input components of a computing device, wherein the natural language input is directed by the user to an automated assistant executing at least in part on the computing device;
    analyzing the natural language input to determine an event associated with the user, one or more tokens of the natural language input that describe the event, and a date associated with the event;
    identifying a plurality of digital images captured on the date;
    comparing an amount of time each of the identified plurality of digital images has been displayed via one or more graphical user interfaces relative to respective amounts of time other digital images of the identified plurality of digital images have been displayed;
    based on the comparing, classifying a subset of the plurality of digital images captured on the date as being related to the event, wherein other digital images of the plurality of digital images captured on the date are not classified as being related to the event; and
    storing, in a searchable database, data indicative of one or more of the tokens that describe the event in association with the subset of the plurality of digital images that were classified as being related to the event, wherein the digital images in the searchable database are searchable based on the one or more tokens that are stored in association with the digital images.

2. The method of claim 1, wherein the obtaining comprises:
    receiving, by the automated assistant, via the one or more input components of the computing device, an audio recording of an utterance by the user directed to the automated assistant; and
    performing speech-to-text processing on the audio recording to generate the natural language input.

3. The method of claim 1, wherein the amount of time any given digital image of the plurality of digital images was displayed comprises a cumulative amount of time the given digital image was displayed across the one or more graphical user interfaces.

4. The method of claim 3, wherein the one or more graphical user interfaces comprise a plurality of graphical user interfaces rendered on a plurality of different displays, and the cumulative amount of time the given image was displayed comprises a cumulative amount of time the given image was displayed across the plurality of graphical user interfaces.

5. The method of claim 1, wherein the comparing includes determining a measure of image manipulation applied to each of the plurality of digital images via one or more digital image manipulation applications.

6. The method of claim 1, wherein the comparing includes determining a measure of sharing associated with each of the plurality of digital images.

7. The method of claim 6, wherein the measure of sharing associated with a given digital image of the plurality of digital images comprises a count of shares of the given digital image by a user who captured the given digital image to a plurality of other users.

8. The method of claim 6, wherein the measure of sharing associated with a given digital image of the plurality of digital images comprises a count of shares of the given digital image across a plurality of other users.

9. The method of claim 1, further comprising formulating, based on the one or more tokens that describe the event, a natural language caption for each digital image of the subset of digital images.

10. The method of claim 1, further comprising:
    applying one or more digital images of the subset of digital images as input across a machine learning classifier to generate an output;

comparing the output to the one or more tokens that describe the event to generate an error; and training the machine learning classifier based on the error, wherein the training configures the machine learning classifier to classify subsequent digital images as being related to the one or more tokens that describe the event.

11. The method of claim 1, further comprising:

performing image recognition processing on the identified plurality of images captured on the date to identify one or more objects or entities associated with the event that are depicted in a subset of the plurality of digital images, wherein the performing includes biasing the image recognition processing towards recognition of one or more of the tokens related to the event;

wherein the classifying is further based on the identified one or more objects or entities.

12. A method implemented using one or more processors, comprising:

obtaining a natural language input provided by a user via one or more input components of a computing device;

analyzing the natural language input to determine an event associated with the user, one or more tokens that describe the event, and a date associated with the event;

identifying a plurality of digital images captured on the date;

performing image recognition processing on the identified plurality of images captured on the date to identify one or more objects or entities associated with the event that are depicted in a subset of the plurality of digital images, wherein the performing includes biasing the image recognition processing towards recognition of one or more of the tokens related to the event;

classifying the subset of the plurality of digital images as being related to the event, wherein other digital images of the plurality of digital images captured on the date that do not depict the one or more objects or entities are not classified as being related to the event; and storing, in a searchable database, data indicative of one or more of the tokens that describe the event in association with the subset of the plurality of digital images that were classified as being related to the event.

13. The method of claim 12, wherein the obtaining comprises:

receiving, by an automated assistant executing at least in part on the computing device, via the one or more input components of the computing device, an audio recording of an utterance by the user directed to the automated assistant; and performing speech-to-text processing on the audio recording to generate the natural language input.

14. The method of claim 12, further comprising formulating, based on the one or more tokens that describe the event, a natural language caption for each digital image of the subset of digital images.

15. A method implemented using one or more processors, comprising:

obtaining a natural language input provided by a user via one or more input components of a computing device, wherein the natural language input is directed by the user to an automated assistant executing at least in part on the computing device;

analyzing the natural language input to determine an event associated with the user, one or more tokens of the natural language input that describe the event, and a date associated with the event;

identifying a plurality of digital images captured on the date;

comparing a number of times each of the identified plurality of digital images has been shared to respective numbers of times other digital images of the identified plurality of digital images have been shared;

based on the comparing, classifying a subset of the plurality of digital images captured on the date as being related to the event, wherein other digital images of the plurality of digital images captured on the date are not classified as being related to the event; and storing, in a searchable database, data indicative of one or more of the tokens that describe the event in association with the subset of the plurality of digital images that were classified as being related to the event, wherein the digital images in the searchable database are searchable based on the one or more tokens that are stored in association with the digital images.

16. The method of claim 15, wherein the obtaining comprises:

receiving, by the automated assistant, via the one or more input components of the computing device, an audio recording of an utterance by the user directed to the automated assistant; and performing speech-to-text processing on the audio recording to generate the natural language input.

17. The method of claim 15, wherein the number of times a given digital image of the plurality of digital images has been shared comprises a count of shares of the given digital image by a user who captured the given digital image to a plurality of other users.

18. The method of claim 15, wherein the number of times a given digital image of the plurality of digital images has been shared further comprises a count of shares of the given digital by a plurality of other users.

19. The method of claim 15, further comprising formulating, based on the one or more tokens that describe the event, a natural language caption for each digital image of the subset of digital images.

* * * * *